June 19, 1951  J. SCHWITTER  2,557,476
BEARING
Filed April 15, 1947  2 Sheets-Sheet 1
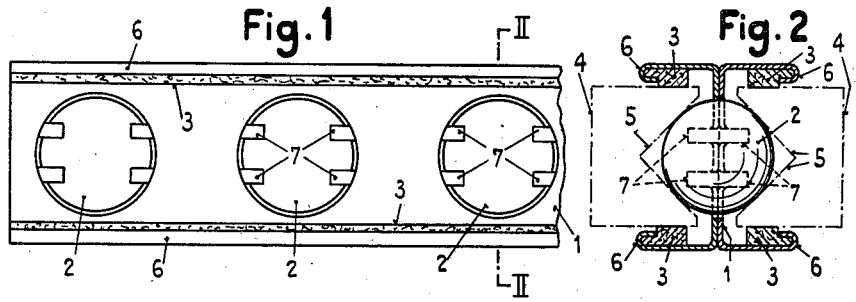
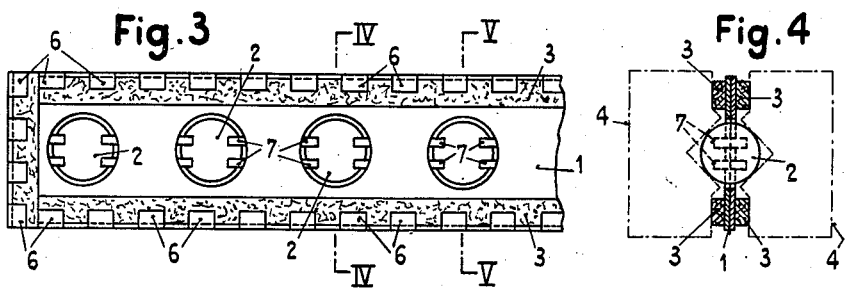
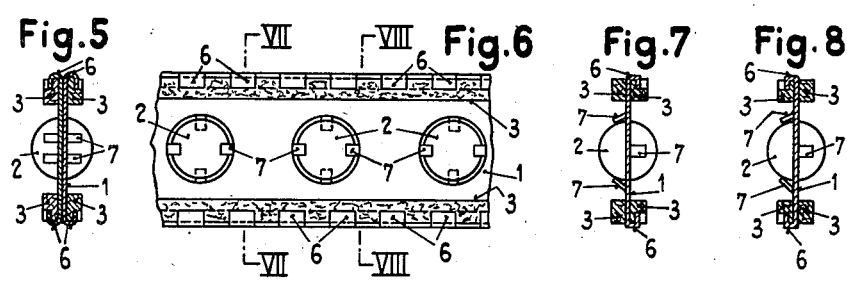
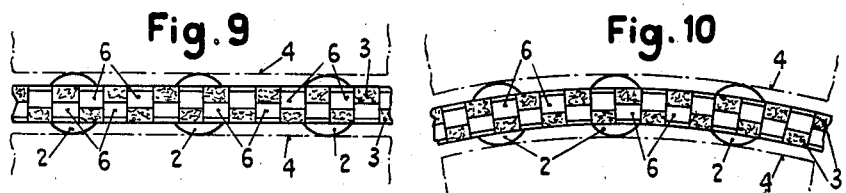
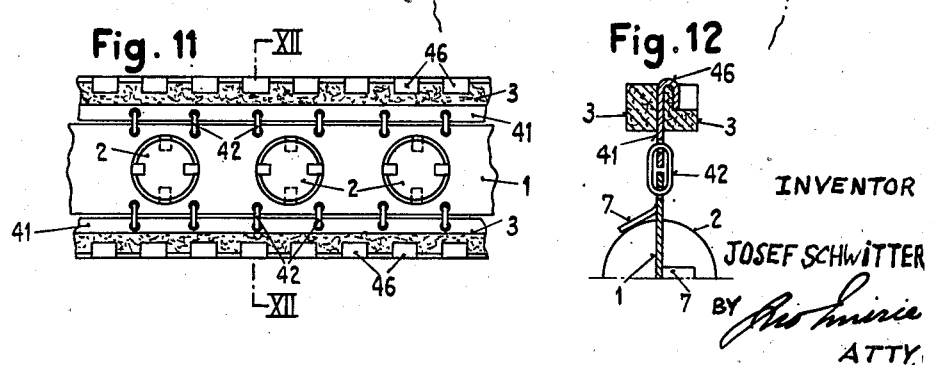
INVENTOR
JOSEF SCHWITTER
BY
ATTY.

June 19, 1951 J. SCHWITTER 2,557,476
BEARING
Filed April 15, 1947 2 Sheets-Sheet 2
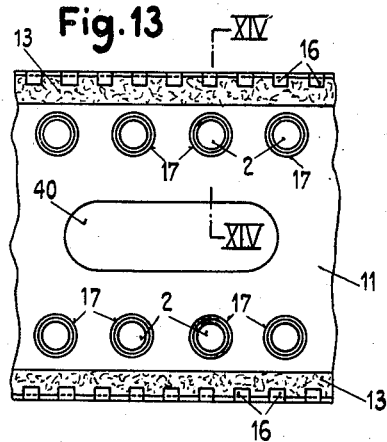
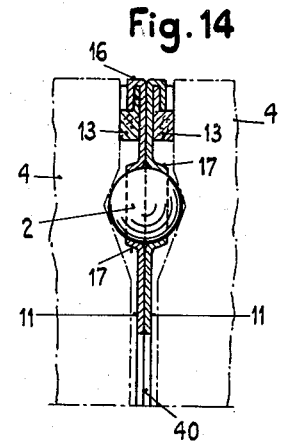
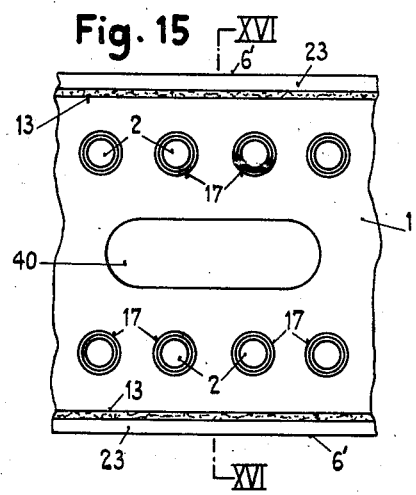
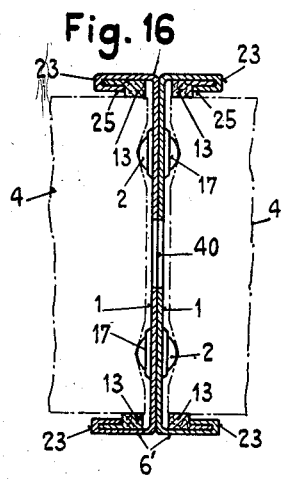
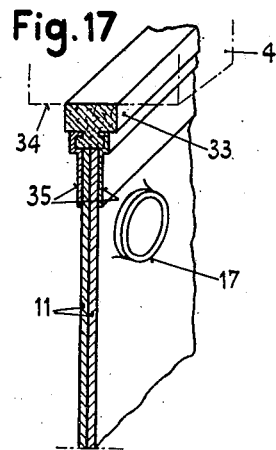
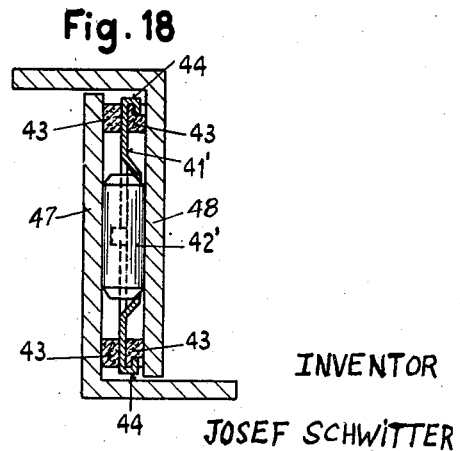
INVENTOR
JOSEF SCHWITTER
BY
ATTY.

Patented June 19, 1951

2,557,476

UNITED STATES PATENT OFFICE 2,557,476

BEARING

Josef Schwitter, Otelfingen, Switzerland

Application April 15, 1947, Serial No. 741,569
In Switzerland February 25, 1946

Section 1, Public Law 690, August 8, 1946
Patent expires February 25, 1966

4 Claims. (Cl. 308—201)

The present invention relates to ball and roller bearings.

Ball bearings are used in preference to sliding bearings principally for the following reasons: There is less loss of power an account of the lower coefficient of friction, the friction of a ball bearing is independent of the viscosity of the lubricant or its temperature, the frictional resistance at starting is very much less than in a sliding bearing, the danger of heated bearings is practically eliminated, a ball bearing of proper construction can adjust itself to deflections of the shaft.

The main object of the invention consists in the provision of means which render the wear practically negligible.

I attain this object by an arrangement of dust collecting means closing the gaps between the two races of the bearing.

The invention might be applied not only for ball bearings but also for roller bearings moreover for bearings with flat races moving to and from upon each other.

In the accompanying drawings several embodiments of my invention are shown by way of examples. In the drawing:

Figs. 1 and 3 show each a part of a ball cage in a plan view,

Figs. 2, 4 and 5 are each a cross-section through a ball bearing on the lines II—II; IV—IV and V—V respectively, Figs. 6, 7 and 8 illustrate a third form of construction in a plan view and in sections on the lines VII—VII and VIII—VIII, Figs. 9, 10 are side views of the cages of ball bearings.

Figs. 11, 13 and 15 show each a further example in a plan view and

Figs. 12, 14 and 16 are cross-sections on the lines XII—XII, XIV—XIV and XVI—XVI respectively Fig. 17 shows part of a cage of a roller bearing and Fig. 18 is a sectional elevation thereof.

Like numbers of reference refer to like parts throughout the specification.

In Figs. 1 and 2 parts of a ball bearing are shown comprising races 4, 4 and a cage 1, in which the balls 2 are rotatably mounted. The cage 1 consists of two flat strips of sheet metal being welded together and having circular holes spaced at regular distances apart and having short lugs 7 embracing loosely said balls 2. The latter run on the faces 5 of the races of the rings 4, 4 standing at right angles to each other. The cage 1 carries along its edges strips 3 of fabric for instance of felt adapted to catch and retain impurities such as dust, gas, etc. and to prevent said impurities to reach the balls and the races. The strips 3 are held by U-shaped hooks 6 formed along the edges of cage 1 at regular short distances apart.

The gap between the rings 4 is closed by the strips 3 bearing on the side walls of said rings 4.

As shown in Figs. 3, 4 and 5 the strips 3 of felt may be fixed along the edges of the cage 1 by means of hooks 6 formed on the edge of sheet metal strip 1. The hooks 6 are short and the dust-catching strip 3 is broad enough to secure an uninterrupted face of fabric closing the gap and catching dust etc.

In Figs. 6, 7 and 8 a construction is shown in which there is but one strip 1 carrying the balls by lugs 7.

As shown in Fig. 9 the cage 1 may be flat adapted to run between two flat races 4 or the cage 1 may be bent as shown in Fig. 10 adapted to run between curved races 4.

In Figs. 11 and 12 two bands 3 of felt or the like are fastened by hooks 46 to small bands 41 which are loosely connected to the member 1 in which the balls 2 are mounted as described above. The parts 1 and 41 are loosely connected by rings 42 arranged at regular distances apart, they may move with reference to each other.

In Figs. 13 and 14 a construction is shown which may be interposed between two parts 4, 4, running adjacent each other. Two flat pieces 11 of sheet metal are provided with two parallel rows of holes 17 adapted to receive balls 2. The pieces 11 are united for instance by welding. The balls 2 run loosely in said holes 17. Along each edge of the pieces 11, parallel to the rows of balls 12 two strips 13 of fabric are arranged one on each face of the pieces 11. The strips 13 of felt are secured by short tongues 16 bent over strips 13 and pressing them on to the pieces 11. The latter are provided each with a hole 40 running along their middle line.

In the construction shown in Figs. 15 and 16 the outer edges 23 are bent off at right angles and in opposite directions to form springy parts 6' pressing the felt on to races 4. The strips 13 close the gaps 25 between said edges 23 and the body 4 on which the part 1 is guided.

In Fig. 17 a construction is shown in which a strip 33 of felt is pressed on the face 34 of a body 4. The strip 33 is fastened to the web 11, of clamping rails 35.

Fig. 18 illustrates a roller bearing. In the web 41' are openings in each of which a roller 42' is rotatably mounted. Along the side edges of the web 41' strips 43 of felt are fastened by lugs 44 formed along the edges of the web 41'.

The races 47, 48 are of angular cross-section. In all the examples shown the strips of felt may be fastened to the carrier by adhesives.

What I wish to secure by U. S. Letters Patent is:

1. In an antifriction bearing wherein a pair of bearing members having respectively opposed races are separated by antifriction bearing elements between said races, and a sealing strip carrying cage is disposed between said bearing members and surrounding said antifriction elements, the combination with said cage of the improvements which comprises two sheets laminated to form said cage, each of said sheets having its edges formed over in U-shape to clamp the sealing strips to the opposite sides of said cage to rigidly support said sealing strips throughout their length.

2. A bearing as defined in claim 1, wherein the seal carrying edge portions of said cage are independent of the element surrounding body and are flexibly secured thereto.

3. A bearing as defined in claim 1, wherein the seal carrying edge portions of said cage are bent at substantially right angles to the body of said cage for engagement of the seals with the sides of said bearing members.

4. A bearing as defined in claim 1, wherein the bearing members are flat with their respective races disposed in a plane.

JOSEF SCHWITTER.

REFERENCES CITED

The following references are of record in the file of this patent:

UNITED STATES PATENTS

| Number | Name | Date |
|---|---|---|
| 980,101 | Hess | Dec. 27, 1910 |

FOREIGN PATENTS

| Number | Country | Date |
|---|---|---|
| 45,460 | Sweden | Feb. 17, 1916 |
| 407,450 | Great Britain | Mar. 22, 1934 |
| 258,081 | Switzerland | Apr. 16, 1949 |